US012581527B2

(12) United States Patent
Yang et al.

(10) Patent No.: US 12,581,527 B2
(45) Date of Patent: Mar. 17, 2026

(54) CHANNEL CODING WITH UNEQUAL ERROR PROTECTION FOR LP UCI AND HP UCI MULTIPLEXING IN NR

(71) Applicant: QUALCOMM Incorporated, San Diego, CA (US)

(72) Inventors: Wei Yang, San Diego, CA (US); Yi Huang, San Diego, CA (US); Peter Gaal, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/648,123

(22) Filed: Jan. 14, 2022

(65) Prior Publication Data

US 2022/0232574 A1 Jul. 21, 2022

Related U.S. Application Data

(60) Provisional application No. 63/138,668, filed on Jan. 18, 2021.

(51) Int. Cl.
*H04W 72/10* (2009.01)
*H04L 1/00* (2006.01)
(Continued)

(52) U.S. Cl.
CPC ........... *H04W 72/56* (2023.01); *H04L 1/0061* (2013.01); *H04W 72/0466* (2013.01); *H04W 72/21* (2023.01)

(58) Field of Classification Search
CPC ..... H04W 72/10; H04W 72/04; H04W 72/14; H04W 72/02; H04W 72/20; H04W 72/21;
(Continued)

(56) References Cited

U.S. PATENT DOCUMENTS 9,385,838 B2 * 7/2016 Hwang ................. H04L 1/0041
10,491,440 B2 * 11/2019 Hwang ................. H04L 5/0051
(Continued)

FOREIGN PATENT DOCUMENTS

CN 111314033 A 6/2020
CN 111835480 A 10/2020
(Continued)

OTHER PUBLICATIONS

CMCC: "Discussion on Remaining Issues of New RNTI for URLLC", 3GPP Draft , R1-1808846, 3GPP TSG RAN WG1 Meeting #94, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 11, 2018 (Aug. 11, 2018), XP051516219, 5 Pages, URL: http://www.3gpp.org/ftp/tsg%5Fran/WG1%5FRL1/TSGR1%5F94/Docs/R1%2D1808846%2Ezip retrieved on Aug. 11, 2018] Section 2-B), p. 2-p. 3 p. 5.
(Continued)

*Primary Examiner* — Man U Phan
(74) *Attorney, Agent, or Firm* — Procopio, Cory, Hargreaves & Savitch LLP/Qualcomm Incorporated

(57) ABSTRACT

This disclosure provides systems, devices, apparatus, and methods, including computer programs encoded on storage media, for channel coding techniques based on unequal error protection for multiplexed LP UCI and HP UCI. In aspects, a UE may multiplex a set of LP UCI bits with a set of HP UCI bits. The set of HP UCI bits may be encoded through both a first encoder and a second encoder, and the set of LP UCI bits may be encoded through the second encoder to generate a set of coded UCI bits. The UE may transmit, to a base station, the set of coded UCI bits through one of a PUCCH or a PUSCH.

30 Claims, 12 Drawing Sheets

800

802
Multiplex a set of LP UCI bits with a set of HP UCI bits

804
Encode the set of LP UCI bits once through a second encoder and the set of HP UCI bits twice through a first encoder and the second encoder to generate a set of coded UCI bits 806
Transmit, to a base station, the set of coded UCI bits through one of a PUCCH or a PUSCH

(51) Int. Cl.
    *H04W 72/044*        (2023.01)
    *H04W 72/21*         (2023.01)
    *H04W 72/56*         (2023.01)
(58) Field of Classification Search
    CPC ..... H04W 72/00; H04W 72/23; H04W 72/56;
                H04W 12/04; H04W 12/79; H04W 28/04;
                H04W 52/10; H04W 52/14; H04W 52/28;
                    H04W 52/32; H04L 1/00; H04L 5/00;
                    H04L 27/23; H04L 25/03; H04L 27/26;
                        H04L 1/16; H04L 1/18; H04L 27/20
    USPC ........................................................ 370/329
    See application file for complete search history.

(56)                    References Cited

U.S. PATENT DOCUMENTS

| | | | | |
|---|---|---|---|---|
| 10,813,118 | B2 * | 10/2020 | Park | H04L 5/00 |
| 11,012,185 | B2 * | 5/2021 | Jeong | H04L 1/0041 |
| 11,082,962 | B2 * | 8/2021 | Park | H04L 1/08 |
| 11,362,759 | B2 * | 6/2022 | Papasakellariou | H04L 1/0073 |
| 11,533,746 | B2 * | 12/2022 | Park | H04W 72/21 |
| 11,617,166 | B2 | 3/2023 | Yang et al. | |
| 11,811,538 | B2 * | 11/2023 | Papasakellariou | H04L 1/1861 |
| 11,838,125 | B2 * | 12/2023 | Jeong | H03M 13/6362 |
| 11,838,914 | B2 * | 12/2023 | Choi | H04W 72/23 |
| 11,870,587 | B2 * | 1/2024 | Yang | H04W 72/21 |
| 12,089,219 | B2 * | 9/2024 | Yang | H04L 1/0025 |
| 2014/0056273 | A1 | 2/2014 | Jang et al. | |
| 2018/0313444 | A1 * | 11/2018 | Asai | F16H 61/08 |
| 2019/0230690 | A1 | 7/2019 | Akkarakaran et al. | |
| 2019/0313444 | A1 | 10/2019 | Marinier et al. | |
| 2021/0321394 | A1 | 10/2021 | Li et al. | |
| 2021/0360610 | A1 | 11/2021 | Kim et al. | |
| 2022/0039088 | A1 | 2/2022 | Zhang et al. | |
| 2022/0078768 | A1 | 3/2022 | El Hamss et al. | |
| 2022/0116953 | A1 * | 4/2022 | Kim | H04W 72/21 |
| 2022/0132496 | A1 * | 4/2022 | Lu | H04W 72/21 |
| 2022/0183025 | A1 | 6/2022 | Fröberg Olsson et al. | |
| 2022/0232487 | A1 * | 7/2022 | Yang | H04W 52/20 |
| 2022/0279569 | A1 * | 9/2022 | Gou | H04L 5/0053 |
| 2022/0369348 | A1 * | 11/2022 | Huang | H04L 1/1671 |
| 2023/0006776 | A1 * | 1/2023 | Yang | H04L 1/00 |
| 2023/0042299 | A1 * | 2/2023 | Zhou | H04W 72/0446 |
| 2023/0284228 | A1 | 9/2023 | Yang et al. | |
| 2023/0318748 | A1 | 10/2023 | Yin et al. | |
| 2023/0354404 | A1 * | 11/2023 | Li | H04W 72/21 |
| 2024/0089970 | A1 * | 3/2024 | Jung | H04L 1/1858 |
| 2024/0146466 | A1 | 5/2024 | Yin et al. | |
| 2025/0039879 | A1 | 1/2025 | Yang et al. | |

FOREIGN PATENT DOCUMENTS

| | | |
|---|---|---|
| WO | 2020096330 A1 | 5/2020 |
| WO | 2020146247 A2 | 7/2020 |
| WO | 2021056320 A1 | 4/2021 |

OTHER PUBLICATIONS

Moderator (OPPO) : "Summary#1 of Email Thread [103-e-NR-IIOT_URLLC_enh-04]", 3GPP Draft, R1-2009546, 3GPP TSG RAN WG1 #102-e, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Nov. 17, 2020 (Nov. 17, 2020), XP051955615, 96 Pages, URL:https://ftp.3gpp.org/tsg_ran/WG1_RL1/TSGR1_103-e/Docs/R1-2009546.zip [retrieved on Nov. 17, 2020] p. 1 Section 2.3-2.3.5, p. 12-p. 50, p. 12-p. 24.

Qualcomm Incorporated: "Intra-UE Multiplexing and Prioritization for IOT and URLLC", Draft, R1-2104666, 3GPP TSG RAN WG1 #105-e, 3rd Generation Partnership Project (3GPP), Mobile Competence Centre, 650, Route Des Lucioles, F-06921 Sophia-Antipolis Cedex, France, vol. RAN WG1, No. e-Meeting, May 10, 2021-May 27, 2021, May 12, 2021 (May 12, 2021), XP052010917, 27 Pages, URL: https://ftp.3gpp.org/tsg_ran/WG1_RL1/TSGR1_105-e/Docs/R1-2104666.zip [retrieved on May 12, 2021] Sections 2.2.2-2.2.5, p. 7-p. 10 figures 8-10.

VIVO: "Intra-UE Multiplexing/Prioritization for Rel-17 URLLC", Draft, R1-2007658, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946464, 9 Pages, URL:https://ftp.3gpp.org/tsg_ran/WG1_RL1/TSGR1_103-e/Docs/R1-2007658.zip [retrieved on Oct. 24, 2020] Section 2, p. 2-p. 6, figure 1, table 1.

Wilus Inc: "Discussion on Intra-UE Multiplexing/Prioritization for URLLC/IIoT", Draft, R1-2009248, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946912, 6 Pages, URL:https://ftp.3gpp.org/tsg_ran/WG1_RL1/TSGR1_103-e/Docs/R1-2009248. zip [retrieved on Oct. 24, 2020] the whole document.

Huawei., et al., "Intra-UE Multiplexing Enhancements", 3GPP TSG RAN WG1 Meeting #103-e, R1-2007567, E-meeting, Oct. 26-Nov. 13, 2020, 8 Pages.

* cited by examiner

FIG. 7A

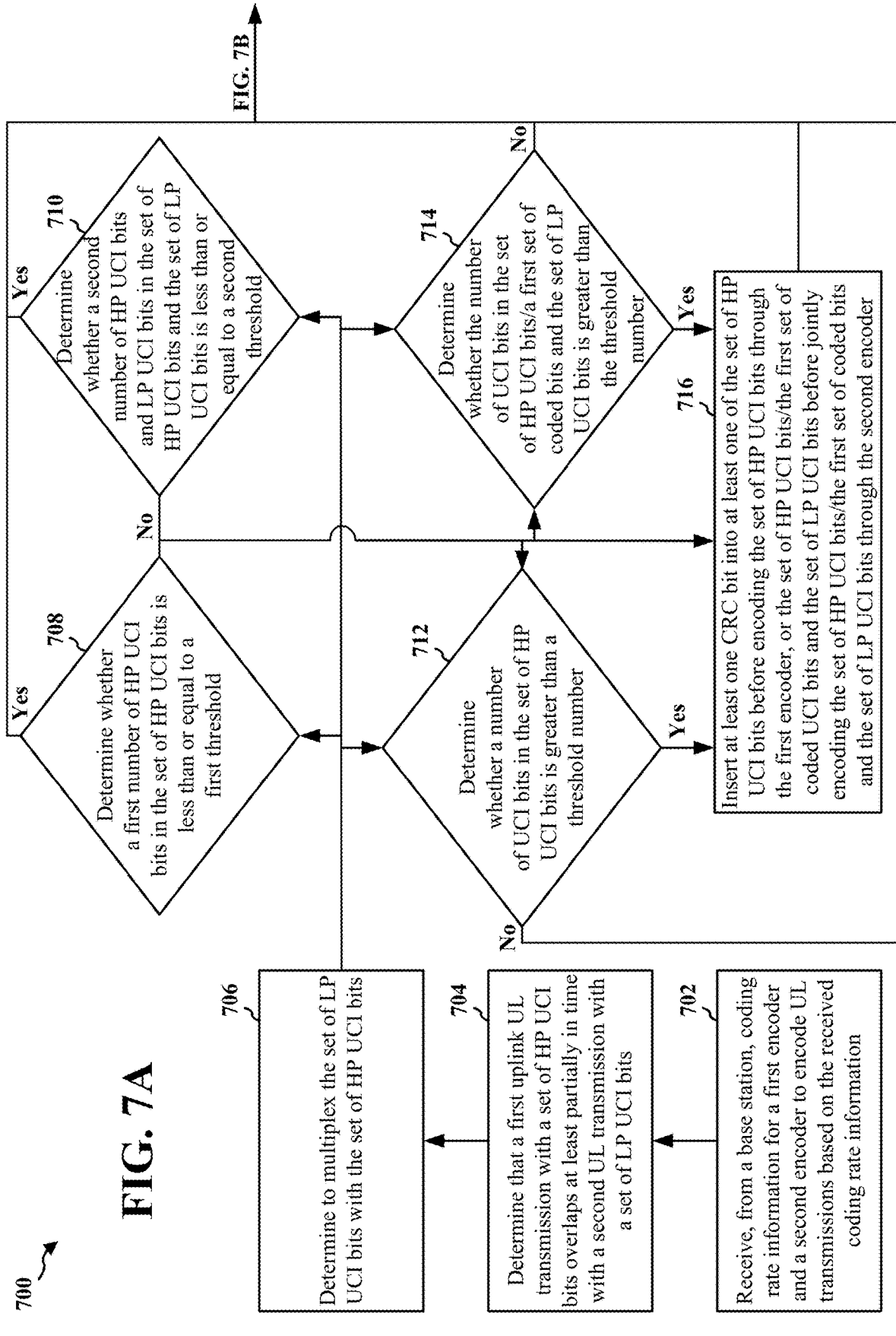

702 Receive, from a base station, coding rate information for a first encoder and a second encoder to encode UL transmissions based on the received coding rate information 704 Determine that a first uplink UL transmission with a set of HP UCI bits overlaps at least partially in time with a second UL transmission with a set of LP UCI bits 706 Determine to multiplex the set of LP UCI bits with the set of HP UCI bits 708 Determine whether a first number of HP UCI bits in the set of HP UCI bits is less than or equal to a first threshold
Yes 710 Determine whether a second number of HP UCI bits and LP UCI bits in the set of HP UCI bits and the set of LP UCI bits is less than or equal to a second threshold
Yes No 712 Determine whether a number of UCI bits in the set of HP UCI bits is greater than a threshold number
Yes No 714 Determine whether the number of UCI bits in the set of HP UCI bits/a first set of coded bits and the set of LP UCI bits is greater than the threshold number
No Yes 716 Insert at least one CRC bit into at least one of the set of HP UCI bits before encoding the set of HP UCI bits through the first encoder, or the set of HP UCI bits/the first set of coded UCI bits and the set of LP UCI bits before jointly encoding the set of HP UCI bits/the first set of coded bits and the set of LP UCI bits through the second encoder

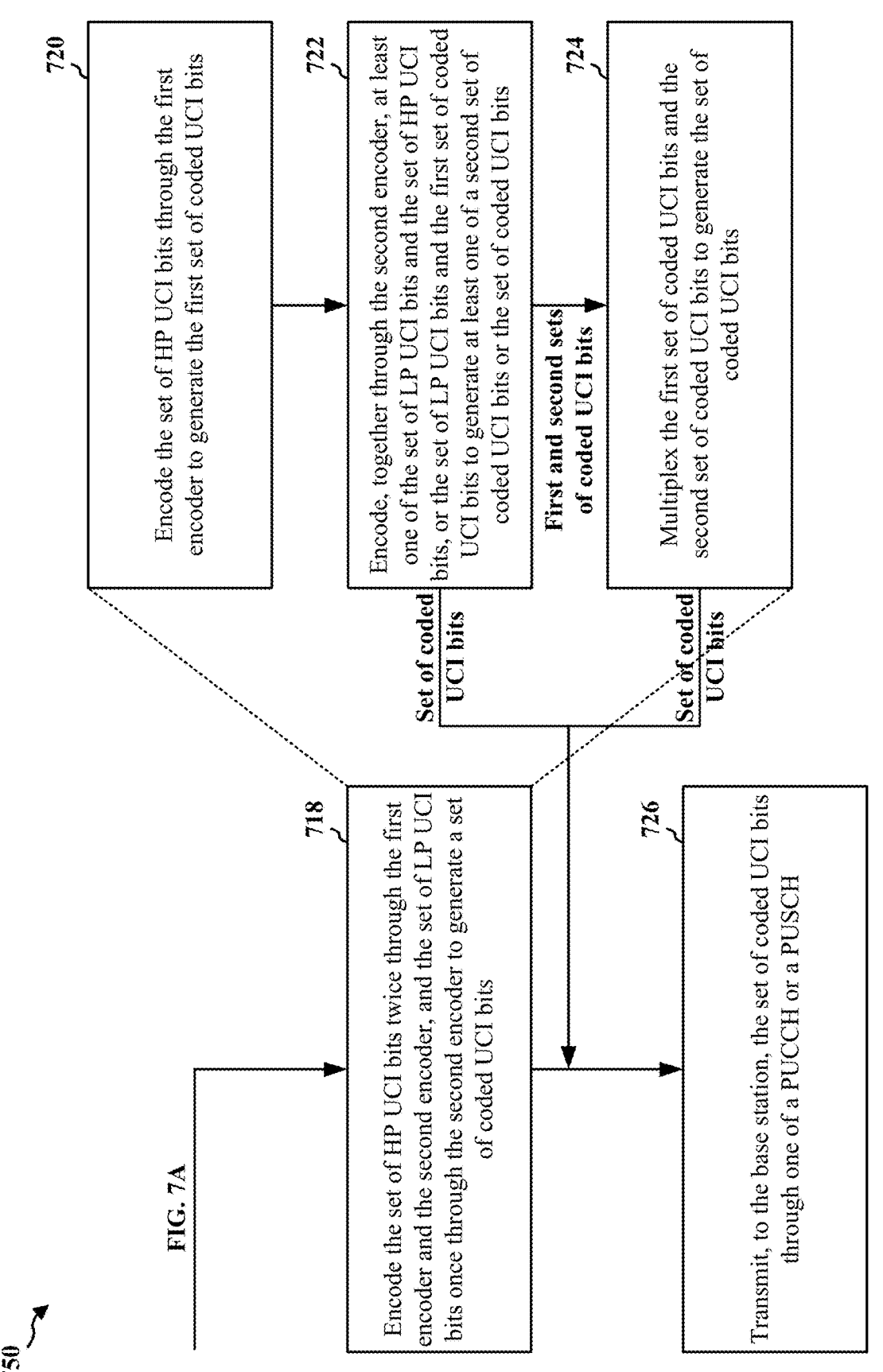

720

Encode the set of HP UCI bits through the first encoder to generate the first set of coded UCI bits

722

Encode, together through the second encoder, at least one of the set of LP UCI bits and the set of HP UCI bits, or the set of LP UCI bits and the first set of coded UCI bits to generate at least one of a second set of coded UCI bits or the set of coded UCI bits First and second sets of coded UCI bits

724

Multiplex the first set of coded UCI bits and the second set of coded UCI bits to generate the set of coded UCI bits Set of coded UCI bits Set of coded UCI bits

Encode the set of HP UCI bits twice through the first encoder and the second encoder, and the set of LP UCI bits once through the second encoder to generate a set of coded UCI bits

726

Transmit, to the base station, the set of coded UCI bits through one of a PUCCH or a PUSCH

750

802 Multiplex a set of LP UCI bits with a set of HP UCI bits

804 Encode the set of LP UCI bits once through a second encoder and the set of HP UCI bits twice through a first encoder and the second encoder to generate a set of coded UCI bits 806 Transmit, to a base station, the set of coded UCI bits through one of a PUCCH or a PUSCH

800

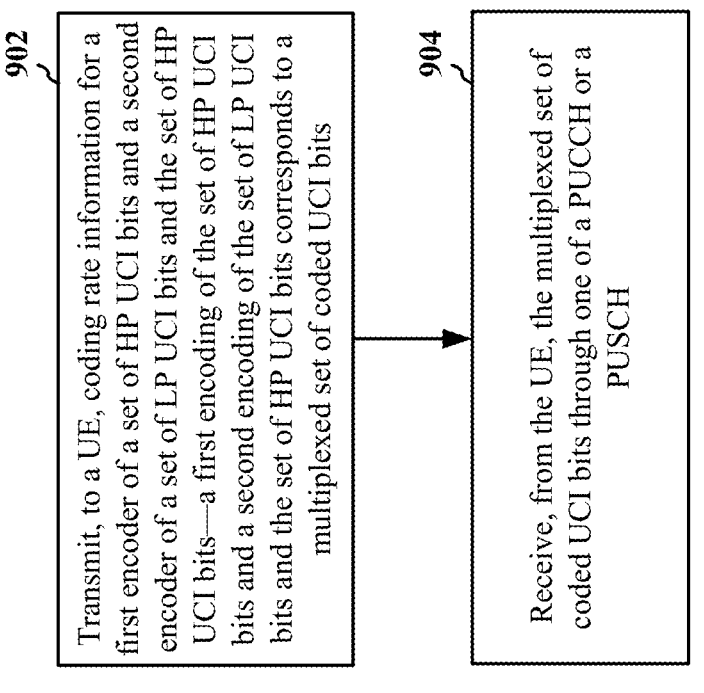

900

902 — Transmit, to a UE, coding rate information for a first encoder of a set of HP UCI bits and a second encoder of a set of LP UCI bits and the set of HP UCI bits—a first encoding of the set of HP UCI bits and a second encoding of the set of LP UCI bits and the set of HP UCI bits corresponds to a multiplexed set of coded UCI bits 904 — Receive, from the UE, the multiplexed set of coded UCI bits through one of a PUCCH or a PUSCH

Cellular RF Transceiver 1122

Reception Component 1130

Coding Rate Information Component 1140

Communication Manager 1132

Transmission Component 1134

Baseband Unit 1104

104

CHANNEL CODING WITH UNEQUAL ERROR PROTECTION FOR LP UCI AND HP UCI MULTIPLEXING IN NR

CROSS REFERENCE TO RELATED APPLICATION(S)

This application claims the benefit of and priority to U.S. Provisional Application Ser. No. 63/138,668, entitled "CHANNEL CODING WITH UNEQUAL ERROR PROTECTION FOR LP UCI AND HP UCI MULTIPLEXING IN NR" and filed on Jan. 18, 2021, which is expressly incorporated by reference herein in its entirety.

TECHNICAL FIELD

The present disclosure relates generally to communication systems, and more particularly, to channel coding techniques with unequal error protection for low priority (LP) uplink control information (UCI) and high priority (HP) UCI multiplexing.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may multiplex a set of low priority (LP) uplink control information (UCI) bits with a set of high priority (HP) UCI bits; encode the set of LP UCI bits once through a second encoder and the set of HP UCI bits twice through a first encoder and the second encoder to generate a set of coded UCI bits; and transmit, to a base station, the set of coded UCI bits through one of a physical uplink control channel (PUCCH) or a physical uplink shared channel (PUSCH).

In another aspect of the disclosure, a method, a computer-readable medium, and an apparatus are provided. The apparatus may transmit, to a user equipment (UE), coding rate information for a first encoder of a set of HP UCI bits and a second encoder of a set of LP UCI bits and the set of HP UCI bits, a first encoding of the set of HP UCI bits and a second encoding of the set of LP UCI bits and the set of HP UCI bits corresponding to a multiplexed set of coded UCI bits; and receive, from the UE, the multiplexed set of coded UCI bits through one of a PUCCH or a PUSCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 7A-7B are flowcharts of a method of wireless communication of a UE.

FIG. 9 is a flowchart of a method of wireless communication of a base station.

DETAILED DESCRIPTION

Figure 1:
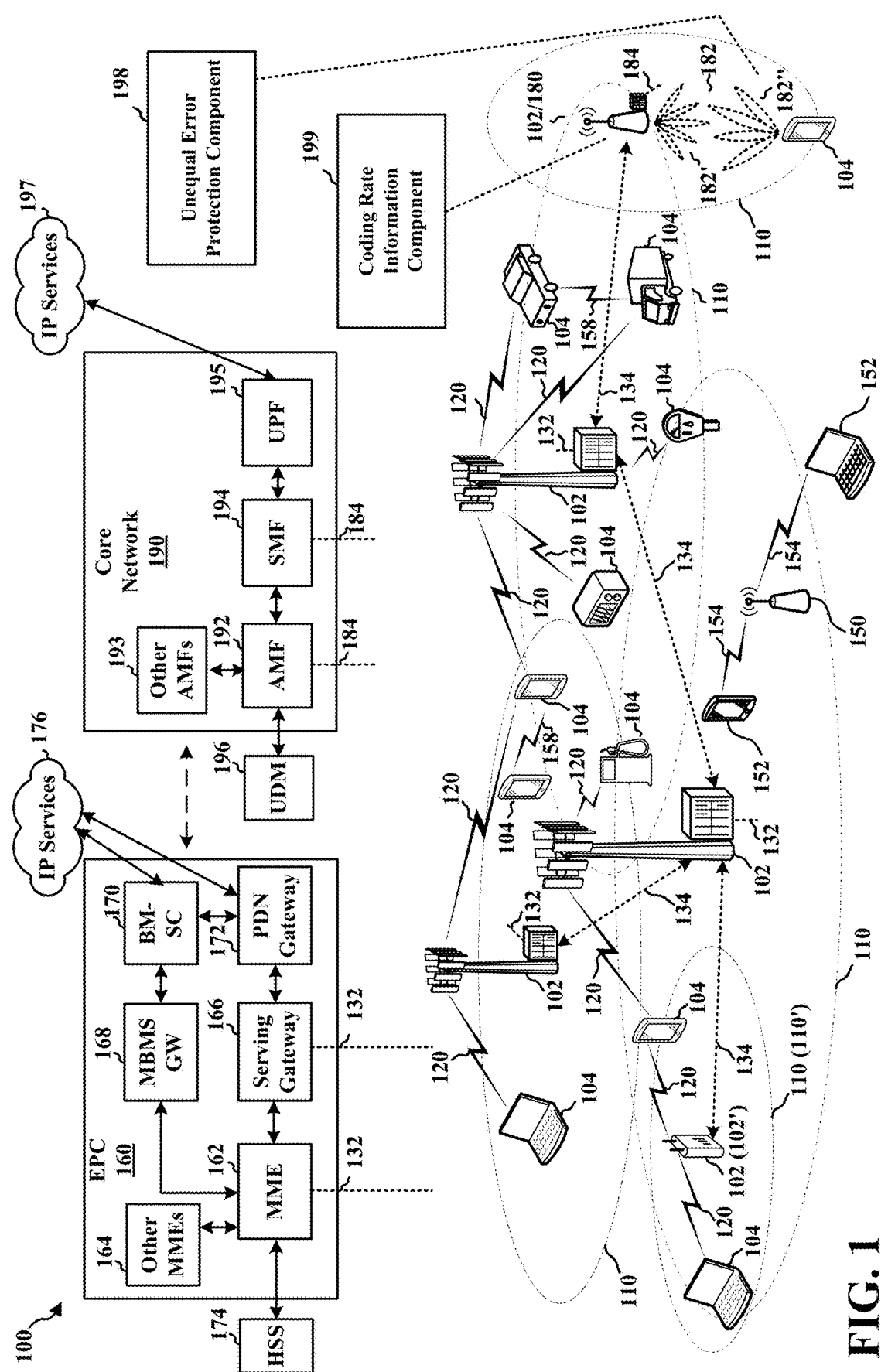
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies.

Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as a gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an unequal error protection component 198 configured to multiplex a set of low priority (LP) uplink control information (UCI) bits with a set of high priority (HP) UCI bits; encode the set of LP UCI bits once through a second encoder and the set of HP UCI bits twice through a first encoder and the second encoder to generate a set of coded UCI bits; and transmit, to a base station, the set of coded UCI bits through one of a physical uplink control channel (PUCCH) or a physical uplink shared channel (PUSCH). In certain aspects, the base station 180 may include a coding rate information component 199 configured to transmit, to a UE, coding rate information for a first encoder of a set of HP UCI bits and a second encoder of a set of LP UCI bits and the set of HP UCI bits, a first encoding of the set of HP UCI bits and a second encoding of the set of LP UCI bits and the set of HP UCI bits corresponding to a multiplexed set of coded UCI bits; and receive, from the UE, the multiplexed set of coded UCI bits through one of a PUCCH or a PUSCH. Although the following description may be focused on 5G NR, the concepts described herein may be applicable to other similar areas, such as LTE, LTE-A, CDMA, GSM, and other wireless technologies.

Figure 2:
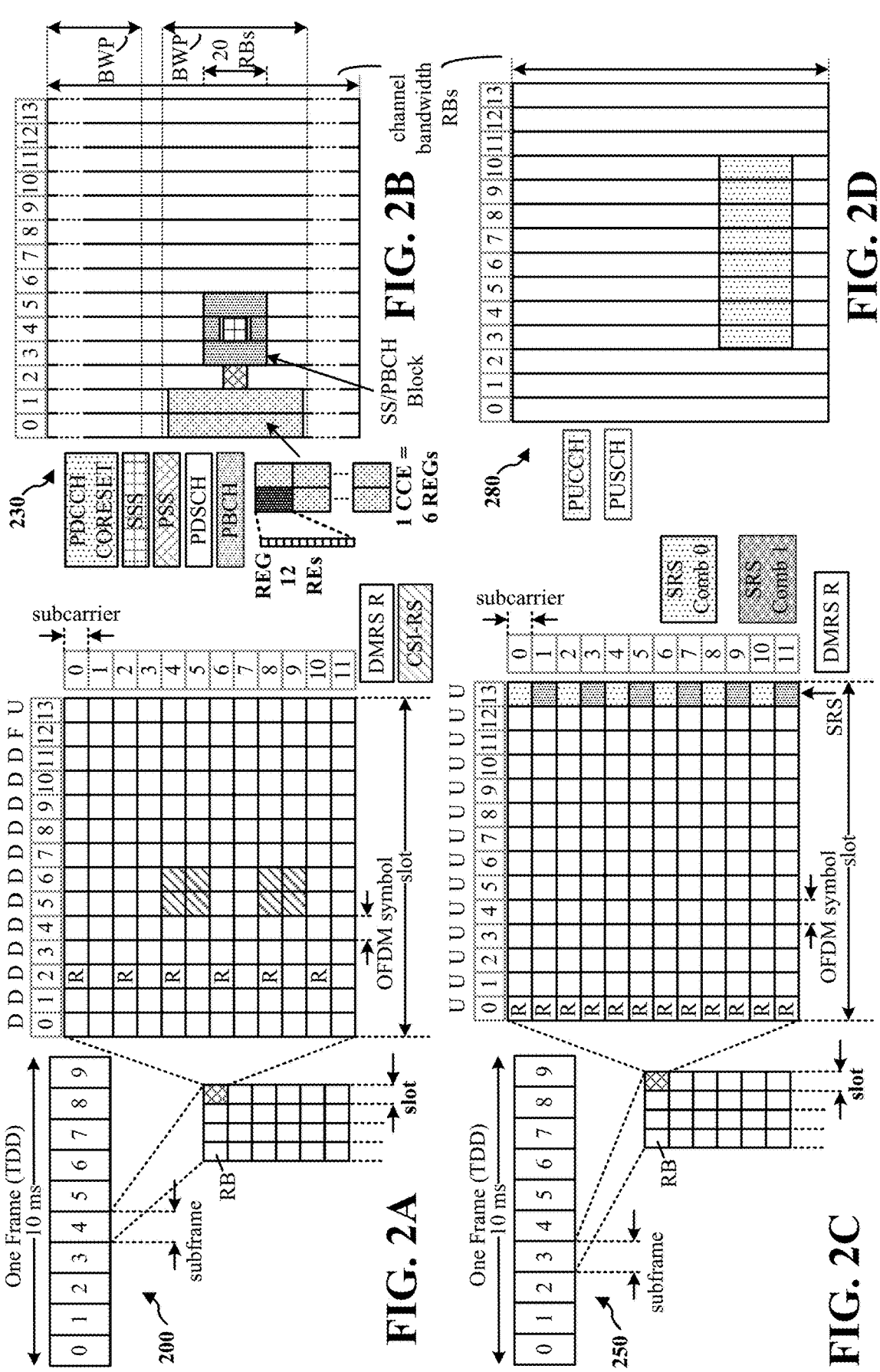
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended.

For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| | SCS | |
| μ | $\Delta f = 2^{\mu} \cdot 15 [kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the PUCCH and DM-RS for the PUSCH. The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
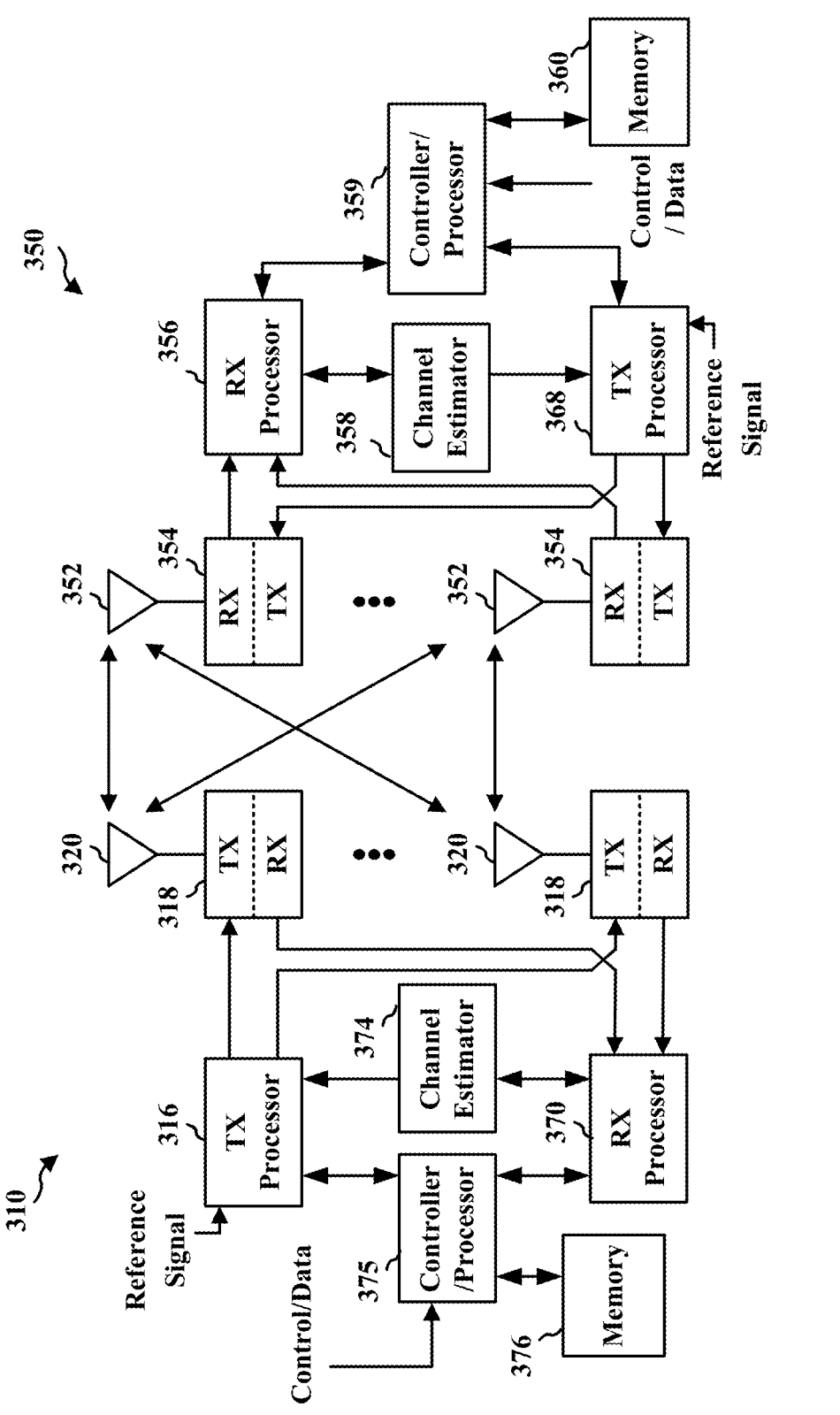
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the unequal error protection component 198 of FIG. 1.

At least one of the TX processor 316, the RX processor 370, and the controller/processor 375 may be configured to perform aspects in connection with the coding rate information component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
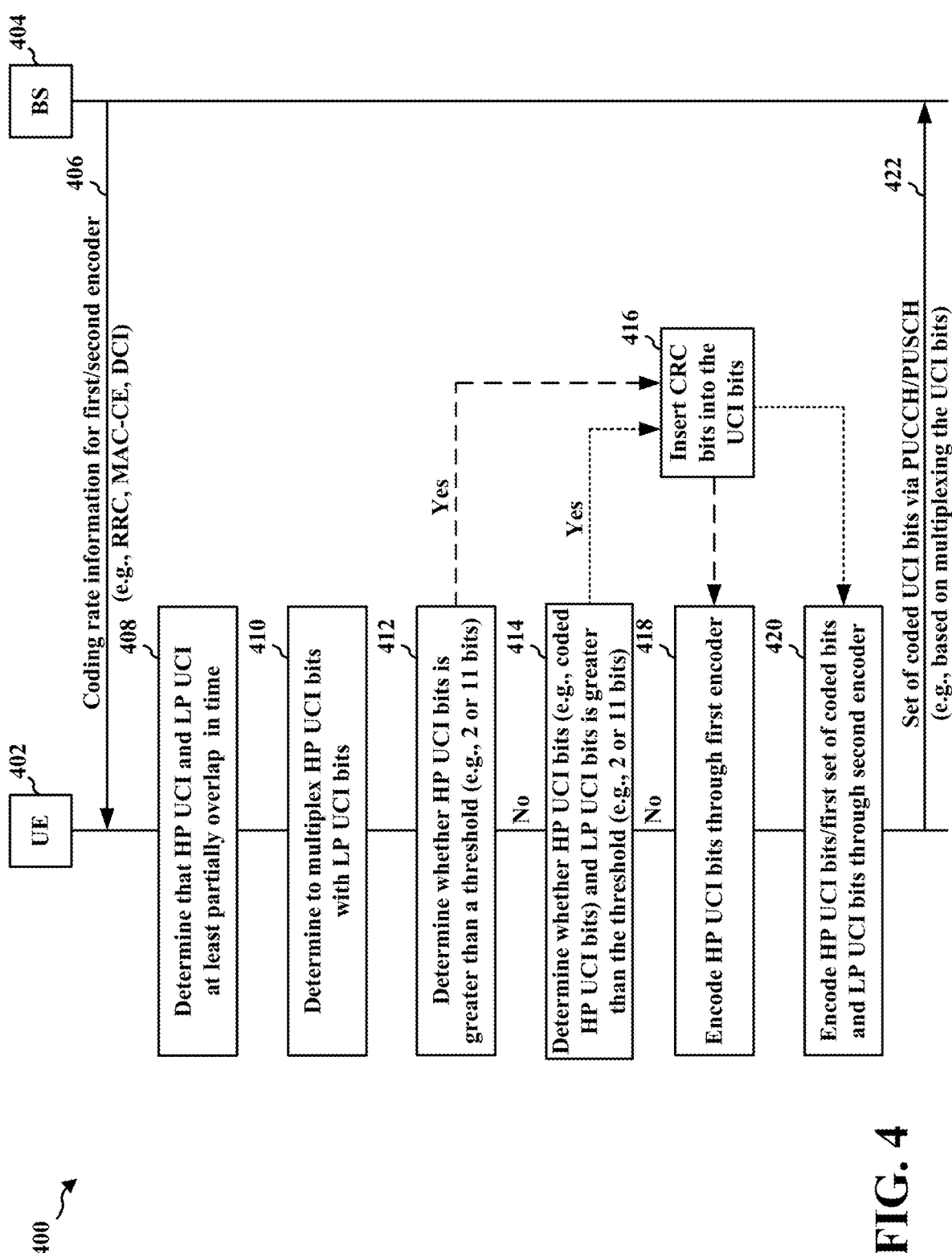
FIG. 4 is a call flow diagram illustrating communications between a UE and a base station.

FIG. 4 is a call flow diagram 400 illustrating communications between a UE 402 and a base station 404. At 406, the base station 404 may transmit coding rate information to the UE 402. The coding rate information may be indicative of a coding rate for a first encoder and/or a second encoder that encodes UL transmissions. The coding rate information may be indicated to the UE 402 via an RRC message, a MAC-control element (MAC-CE), or DCI. For example, a first coding rate for the first encoder and a second coding rate for the second encoder may be RRC configured for a PUCCH resource used to transmit HP UCI and LP UCI. At 408, the UE 402 may determine that an HP UCI transmission and an LP UCI transmission at least partially overlap in time. Based on the determination, at 408, the UE 402 may determine, at 410, to multiplex HP UCI bits of the HP UCI transmission with LP UCI bits of the LP UCI transmission.

At 412, the UE 402 may determine whether a number of the HP UCI bits is greater than a threshold. In some examples, the threshold may be a 2-bit threshold or an 11-bit threshold. If the UE 402 determines, at 412, that the number of HP UCI bits is greater than the threshold, the UE 402 may insert, at 416, cyclic redundancy check (CRC) bits into the UCI bits (e.g., the HP UCI bits) and provide the bits to the first encoder. If the UE 402 determines, at 412, that the number of HP UCI bits is not greater than the threshold, the UE 402 may determine, at 414, whether a number of the HP UCI bits, which may be coded HP UCI bits, and the LP UCI bits are together greater than the threshold (e.g., the 2-bit threshold or the 11-bit threshold). If the UE 402 determines, at 414, that the number of coded/non-coded HP UCI bits and LP UCI bits are together greater than the threshold, the UE 402 may insert, at 416, CRC bits into the UCI bits (e.g., the coded/non-coded HP UCI bits and the LP UCI bits) and provide the bits to the second encoder. If the UE 402 determines, at 414, that the number of coded/non-coded HP UCI bits and LP UCI bits are together not greater than the threshold, the UE 402 may encode the UCI bits without inserting, at 416, the CRC bits into the UCI bits.

At 418, the UE 402 may encode the HP UCI bits for a first time through the first encoder. The UCI bits received at the first encoder may or may not include CRC bits.

At 420, the UE 402 may encode the HP UCI bits for a second time and the LP UCI bits for a first time jointly through the second encoder. The second encoding of the HP UCI bits may be performed independently of the first encoding of the HP UCI bits, or the second encoding of the HP UCI bits may be based on receiving the coded HP UCI bits and further encoding the coded HP UCI bits from the first encoder for a second time. The UCI bits received at the second encoder may or may not include CRC bits. At 422, the UE 402 may transmit a set of coded UCI bits to the base station 404 via PUCCH/PUSCH (e.g., based on multiplexing the UCI bits).

Figure 5:
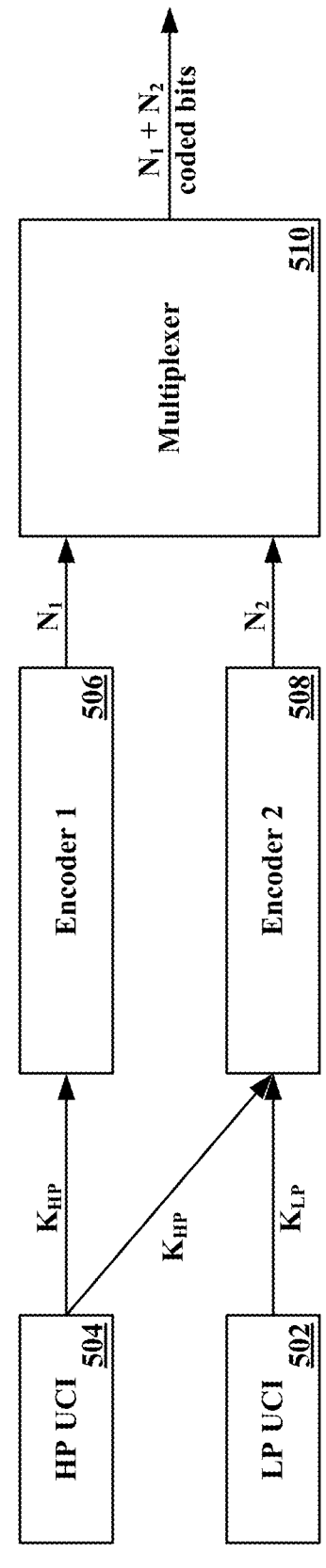
FIG. 5 illustrates a diagram of a first channel coding techniques for providing unequal error protection to low priority (LP) uplink control information (UCI) and high priority (HP) UCI based on multiplexing the LP UCI and the HP UCI.
Figure 6:
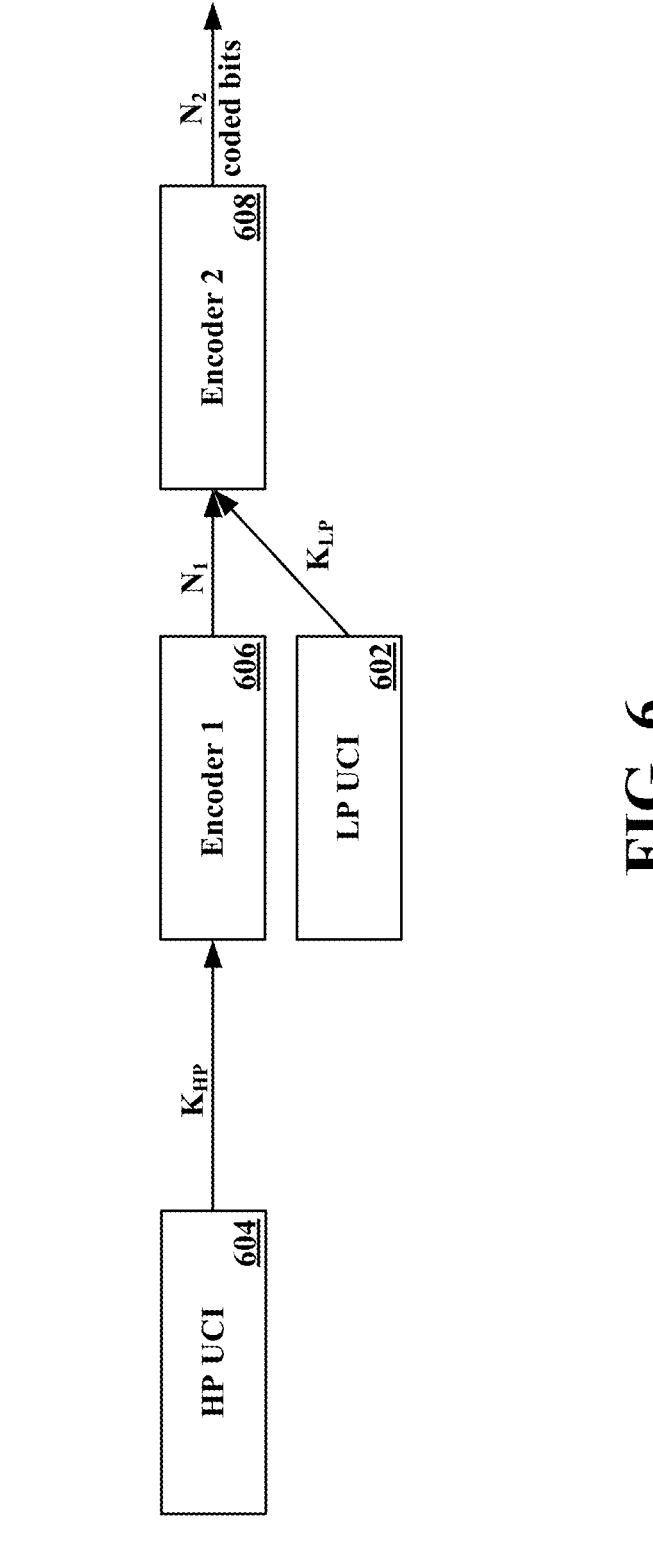
FIG. 6 illustrates a diagram of a second channel coding techniques for providing unequal error protection to LP UCI and HP UCI based on multiplexing the LP UCI and the HP UCI.

FIGS. 5-6 illustrate diagrams 500-600 of channel coding techniques for providing unequal error protection to LP UCI 502/602 and HP UCI 504/604 when the LP UCI 502/602 and the HP UCI 504/604 are multiplexed. If a UE determines to transmit the LP UCI 502 and the HP UCI 504 in a same transmission via a multiplexer 510, increased error protection for the HP UCI 504 may improve a reliability of the HP UCI 504 over a reliability of the LP UCI 502.

Two priority levels may be defined for UL transmissions based on different reliabilities and/or different latencies of associated network traffic. For example, an LP transmission may be used to transmit eMBB traffic, whereas an HP transmission may be used to transmit URLLC traffic. HP UCI may be UCI associated with a priority index of 1, and LP UCI may be UCI associated with a priority index of 0. If two UL transmissions of different priorities collide (e.g., the two UL transmissions are scheduled on the same time and frequency resources), the UE may not be able to transmit the two UL transmissions simultaneously. Therefore, the UE may drop the LP UL transmission (e.g., PUCCH/PUSCH) and transmit the HP UL transmission when the LP UL transmission collides with the HP UL transmission in a same PUCCH group.

Both the LP UCI 502/602 and the HP UCI 504/604 may be scheduled on the PUCCH/PUSCH. UCI, such as HARQ-ACK, may be initially scheduled on the PUCCH, but after a PUCCH including the HARQ-ACK collides with a PUSCH of a same priority, the UE may include the HARQ-ACK on the PUSCH. As such, the HARQ-ACK may be transmitted on the PUCCH, or the HARQ-ACK may be transmitted on the PUSCH, where the PUSCH may collide with the transmission of the HP UCI 504/604.

Dropping the LP UCI 502/602 each time a collision occurs may generate inefficiencies for the UE. Further, the UE may determine to multiplex the LP UCI 502/602 and the HP UCI 504/604 into a same PUCCH/PUSCH including both the LP UCI 502/602 and the HP UCI 504/604. Since the HP UCI 504/604 may be utilized for transmissions associated with a higher reliability or a lower latency, the HP UCI 504/604 may be improved based on increased error protection in comparison to error protection of the LP UCI 502/602. The UE may also be configured to reduce a number of occasions where the LP UCI 502/602 is dropped. Different levels of protection for the LP UCI 502/602 and the HP UCI 504/604 may be provided via channel coding techniques. For example, a channel coding technique associated with multiplexing the LP UCI 502/602 and the HP UCI 504/604 on the PUCCH/PUSCH may provide an unequal error protection for the LP UCI 502/602 and the HP UCI 504/604.

A channel coding technique may be based on a payload size of the UCI. For example, the UCI may include a payload size of K bits, which may be encoded by the UE. If the payload size is K=1, a repetition code may be executed to map a bit (e.g., bit a) into a sequence such as [a, a, . . . ]. If the payload size is K=2, a simplex code may be initially executed to map two bits (e.g., [a, b]) into a 3-bit tuple (e.g., corresponding to [a, b, a⊕b]), where ⊕ represents an "exclusive or" (XOR) operation, followed by execution of a repetition code configured to repeats a certain pattern until a determined coding rate is reached. If the payload size is $3 \leq K \leq 11$, a modified [11,32] Reed-Muller code may be executed to encode the UCI. If the payload size is K>11, a polar code may be executed to encode the UCI. Prior to the UE performing polar coding, the UE may insert one or more CRC bits into the UCI payload, which may be a difference from instances where $K \leq 11$ and no CRC bit is inserted into the UCI payload prior to performing channel encoding. Notwithstanding the payload size K, the encoding techniques may provide a same or similar level of error protection for each bit of the UCI payload. For example, a bit error rate associated with a first bit and a last bit (e.g., $a_0 \ldots a_{k-1}$) may be a same or similar bit error rate, which may correspond to a same or similar reliability. Hence, the channel coding technique may not provide different/unequal error protection for the bits of the payload based on whether a priority of the payload is LP or HP.

In the diagram 500, $K_{LP}$ LP UCI bits and $K_{HP}$ HP UCI bits may be transmitted on a same PUCCH/PUSCH based on providing the $K_{HP}$ HP UCI bits to two encoders (e.g., a first encoder 506 and a second encoder 508). The $K_{LP}$ LP UCI bits and the $K_{HP}$ HP UCI bits may be jointly encoded via the second encoder 508 based on a channel code to generate $N_2$ coded bits. The $N_2$ coded bits may be further provided from the second encoder 508 to the multiplexer 510. The $K_{HP}$ HP UCI bits may be additionally provided to the first encoder 506 to encode the $K_{HP}$ HP UCI bits and generate $N_1$ coded bits. The $N_1$ coded bits may be further provided from the first encoder 506 to the multiplexer 510. That is, the first encoder 506 may receive the bits of the HP UCI 504, whereas the second encoder 508 may receive the bits of the LP UCI 502 and the bits of the HP UCI 504. The outputs of the first encoder 506 and the second encoder 508 may be multiplexed/concatenated by the multiplexer 510, to provide an output of $N_1+N_2$ coded bits. Both the $N_1$ coded bits and the $N_2$ coded bits may be transmitted on the PUCCH/PUSCH. To multiplex the $N_1$ coded bits and the $N_2$ coded bits, the $N_1$ coded bits may be arranged before or after the $N_2$ coded bits. In some configurations, a further repetition code may be applied to the output of the multiplexer 510 to generate a total number of coded bits determined to fit the PUCCH/PUSCH resource.

Separate encoding may be used when a payload X for the HP UCI and a payload Y for the LP UCI are above a threshold. For example, a first encoder may encode X HP bits and a second encoder may independently encode Y LP bits. Joint encoding (e.g., with or without unequal error protection) may be used when the payload X for the HP UCI and/or the payload Y for the LP UCI is less than or equal to a threshold L. A first configuration may include X≤L and Y≤L (e.g., L=2, and X+Y=1+1, 1+2, 2+1, 2+2). A second configuration may include X≤L or Y≤L. A third configuration may include X+Y≤L. In examples, the threshold L may correspond to 2 bits or 11 bits.

The two instances of coding applied to the $K_{HP}$ HP UCI via the first encoder 506 and the second encoder 508 may increase the reliability of the HP UCI 504 and provide an increased/unequal level of error protection in comparison to the error protection of the LP UCI 502, which may be encoded once via the second encoder 508. Since the second encoder 508 provides an equal level of error protection to both the LP UCI 502 and the HP UCI 504, and the first encoder 506 provides an additional level of error protection to the HP UCI 504, the HP UCI 504 may have an increased/unequal level of error protection in comparison to the level of error protection for the LP UCI 502 via the additional instance of encoding the HP UCI 504. That is, the combined output corresponding to the $N_1+N_2$ coded bits transmitted from the multiplexer 510 may provide a higher level of error protection to the HP UCI 504.

If the total payload size $K_{LP}+K_{HP}$ is greater than 11 bits, CRC bits may be inserted into the payload before the second encoder 508 encodes the payload into the $N_2$ coded bits. Similarly, if the payload size of $K_{HP}$ is greater than 11, a different set of CRC bits may be inserted into the $K_{HP}$ HP UCI bits before the first encoder 506 encodes the payload into the $N_1$ coded bits. Hence, if the payload size of the HP UCI 504 is greater than 11 bits, CRC bits may be added to both an input of the first encoder 506 and an input of the second encoder 508. However, if the payload size of the HP UCI 504 received by the first encoder 506 is less than 11 bits, but a sum of the payload size of the HP UCI 504 and the LP UCI 502 received by the second encoder 508 is greater than 11 bits, CRC bits may be inserted into the input of the second encoder 508, but may not be inserted into the input of the first encoder 506.

A first coding rate ($R_1$) of the first encoder 506 and a second coding rate ($R_2$) of the second encoder 508 may be separately indicated to the UE by the base station (e.g., via a configuration of a corresponding PUCCH resource). The coding rate R may correspond to a ratio of the input bits K to output bits N of the encoders (e.g., R=K/N). The two coding rates for the PUCCH may be configured for the PUCCH resource. That is, after the UE is scheduled with the PUCCH resource, the coding rate may be configured for the PUCCH resource, such that the UE may determine the coding rate for a corresponding PUCCH transmission.

The coding rate for the PUSCH transmission may be determined based on a modulation and coding scheme (MCS) of the PUSCH as well as a beta factor (β), which may indicate a ratio between the coding rate of the UCI and the data. Based on the MCS and β parameters, which may be signaled in DCI, the UE may determine the coding rate applied to the UCI to transmit the payload. If the LP UCI 502 and the HP UCI 504 is to be multiplexed via the multiplexer 510 for a single transmission, the base station may signal to the UE, prior to the multiplexing, the first coding rate ($R_1$) for the first encoder 506 and the second coding rate ($R_2$) for the second encoder 508. The first coding rate ($R_1$) and the second coding rate ($R_2$) may be indicated based on two β values and one MCS, where the one MCS may be indicative of the coding rate of the UL shared channel (e.g., data included in the PUSCH), and where the two β values may be signaled to the UE by the base station. For transmission on PUCCH, both the first coding rate ($R_1$) and the second coding rate ($R_2$) may be configured for the PUCCH resource via RRC. Further, for transmission on PUSCH, the base station may signal to the UE the first coding rate ($R_1$) and the second coding rate ($R_2$) via DCI.

In a first example, where the UE determines to multiplex 1 bit (a) associated with HP HARQ-ACK and 1 bit (b) associated with LP HARQ-ACK on a PUSCH, the UE may encode the HP HARQ-ACK and the LP HARQ-ACK based on [a, b, a⊕b, a], followed by a repetition, to provide a determined coding rate. The sequence [a, b, a⊕b, a] may include a first portion (e.g., a, b, a⊕b) for encoding the bits (a) and (b) based on simplex code and a second portion (e.g., a) associated with a repetition code for the first bit (a), where (a) may correspond to the HP HARQ-ACK. Thus, the code may include 3 bits that include information associated with bit (a) and 2 bits that include information associated with bit (b), such that increased error protection may be provided for the HP HARQ-ACK in comparison to the error protection for the LP HARQ-ACK.

In a second example, the sequence may be [a, b, a⊕b, a, a, a]. The first portion of the code [a, b, a⊕b] including the bits (a) and (b) may be based on simplex code, and the second portion of the code [a, a, a] may be associated with a repetition code that repeats the bit (a) 3 times. The entire code [a, b, a⊕b, a, a, a] may then be repeated until a determined coding rate is reached. The first example and the second example may provide different levels of error protection for the bit (a). In particular, an imbalance of error protection between the bits (a) and (b) may be larger in the second example (e.g., having a ratio of 5:2) than the imbalance of error protection between the bits (a) and (b) in the first example (e.g., having a ratio of 3:2). Accordingly, the level of error protection to the bits (a) and (b) may be adjusted based on a number of bits (a) inserted into the sequence. Adjusting the level of error protection based on the number of bits may be performed in association with two coding rates configured/indicated to the UE. That is, the UE may determine the number of bits (a) inserted into the sequence based on the first coding rate ($R_1$) of the first encoder 506 and the second coding rate ($R_2$) of the second encoder 508 via $$N = \left\lceil \frac{3R_2}{2R_1} \right\rceil.$$

In the diagram 600, $K_{LP}$ LP UCI bits and $K_{HP}$ HP UCI bits may be transmitted on a same PUCCH/PUSCH based on providing the bits of the HP UCI 604 through two encoders (e.g., a first encoder 606 and a second encoder 608). The first encoder 606 may encode the $K_{HP}$ HP UCI bits into $N_1$ coded bits, which may be further provided to the second encoder 608. The second encoder 608 may receive the $N_1$ coded bits as well as the $K_{LP}$ LP UCI bits and jointly encode the $N_1$ coded bits and the $K_{LP}$ LP UCI bits based on a current channel code. A payload size of an input to the second encoder 608 may be equal to $N_1+K_{LP}$. After encoding the $N_1$ coded bits and the $K_{LP}$ LP UCI bits, an output of the second encoder 608 may correspond to $N_2$ coded bits, which may be transmitted on the PUCCH/PUSCH. Accordingly, the bits of the HP UCI 604 may be encoded twice, whereas the bits of the LP UCI 602 may be encoded once. Therefore, the HP UCI 604 may include increased error protection in comparison to the error protection of the LP UCI 602 based on an initial level of error protection being added to the HP UCI 604 via the first encoder 606 before the coded HP UCI 604 and the LP UCI 602 are jointly encoded by the second encoder 608.

The encoding applied to the $K_{HP}$ HP UCI via the first encoder 606 and the joint encoding applied to the $N_1$ coded bits and the $K_{LP}$ LP UCI via the second encoder 608 may be based on inserting CRC bits into the payload, if the payload size is greater than 11 bits. The CRC bits may be added to one or both of the input of the first encoder 606 and/or the input of the second encoder 608 based on whether a total size of the respective inputs includes more than 11 bits. For example, if the payload size of the HP UCI 604 received by the first encoder 606 is less than 11 bits, but a sum of the payload size of the $N_1$ coded bits and the LP UCI 602 received by the second encoder 608 is greater than 11 bits, the CRC bits may be inserted into the input of the second encoder 608, but may not be inserted into the input of the first encoder 604. The coding rates of the first encoder 606 and the second encoder 608 may be separately indicated to the UE by the base station (e.g., via a configuration for the corresponding PUCCH resource).

While techniques described herein may be associated with multiplexing HP UCI 504/604 and LP UCI 502/602 based on unequal error protection, the description of such techniques is for exemplary purposes and is not intended to limit the invention to the techniques being described. For instance, a same technique described herein in the context of multiplexing HP UCI 504/604 and LP UCI 502/602 may also be used in the context of encoding other content associated with different priorities (e.g., content included in DCI, uplink/ downlink/sidelink data channels, SCI, system information, etc.). Further, a same technique may be applicable to content associated with more than two priority levels. In an example, three priority levels may correspond to priority levels 0, 1, and 2, where 0<1<2. That is, priority level 2 may correspond to a highest priority level, priority level 1 may correspond to an intermediate priority level, and priority level 0 may correspond to a lowest priority level. In such cases, two or more of the following encodings may occur:

A first example encoder may encode information associated with priority level 2;

A second example encoder may encode information associated with priority level 2 and priority level 1;

A third example encoder may encode information associated with priority level 2, priority level 1, and priority level 0;

A fourth example encoder may encode information associated with priority level 2 and priority level 0;

A fifth example encoder may encode information associated with priority level 1 and priority level 0;

A sixth example encoder may encode information associated with priority level 1; and/or A seventh example encoder may encode information associated with priority level 0.

FIGS. 7A-7B are flowcharts 700-750 of a method of wireless communication. The method may be performed by a UE (e.g., the UE 104/402; the apparatus 1002; etc.), which may include the memory 360 and which may be the entire UE 104/402 or a component of the UE 104/402, such as the TX processor 368, the RX processor 356, and/or the controller/processor 359.

At 702, the UE may receive, from a base station, coding rate information for a first encoder and a second encoder to encode UL transmissions based on the received coding rate information. For example, referring to FIGS. 4-6, the UE 402 may receive, at 406, coding rate information from the base station 404 for the first/second encoder. The coding rate information may be received, at 406, through one of a RRC message, a MAC-CE, or DCI. The coding rate information received, at 406, may include information indicating a first coding rate for the first encoder 506/606 and a second coding rate for the second encoder 508/608. The reception, at 702, may be performed by the reception component 1030 of the apparatus 1002 in FIG. 10.

At 704, the UE may determine that a first uplink UL transmission with a set of HP UCI bits overlaps at least partially in time with a second UL transmission with a set of LP UCI bits. For example, referring to FIG. 4, the UE 402 may determine, at 408, that HP UCI and LP UCI at least partially overlap in time. The determination, at 704, may be performed by the UCI bit component 1040 of the apparatus 1002 in FIG. 10.

At 706, the UE may determine to multiplex the set of LP UCI bits with the set of HP UCI bits. For example, referring to FIGS. 4-5, the UE 402 may determine, at 410, to multiplex HP UCI bits with LP UCI bits. In aspects, the multiplexer 510 may be used to multiplex the HP UCI bits with the LP UCI bits. The determination, at 706, may be performed by the multiplexer component 1046 of the apparatus 1002 in FIG. 10.

At 708, the UE may determine whether a first number of HP UCI bits in the set of HP UCI bits is less than or equal to a first threshold. For example, referring to FIG. 4, the UE 402 may determine that the HP UCI bits is less than or equal to the threshold based on determining, at 412, that the HP UCI bits is not greater than the threshold. If, at 708, the HP UCI bits is determined to be less than or equal to the first threshold, the UE may encode the HP UCI bits based on the diagram 750. If, at 708, the HP UCI bits is determined not to be less than or equal to the first threshold, the UE may insert CRC bits into the UCI bits (e.g., at 716 and 416). Alternatively, the UE may determine to perform block 712 or block 714. In aspects, the first threshold (e.g., determined at 412) may 2 bits or 11 bits. The determination, at 708, may be performed by the UCI bit component 1040 of the apparatus 1002 in FIG. 10.

At 710, the UE may determine whether a second number of HP UCI bits and LP UCI bits in the set of HP UCI bits and the set of LP UCI bits is less than or equal to a second threshold. For example, referring to FIG. 4, the UE 402 may determine that the HP UCI bits and the LP UCI bits is less than or equal to the threshold based on determining, at 414, that the HP UCI bits and the LP UCI bits is not greater than the threshold. If, at 710, the HP UCI bits and the LP UCI bits is determined to be less than or equal to the second threshold, the UE may encode the HP UCI bits and the LP UCI bits based on the diagram 750. If, at 710, the HP UCI bits and the LP UCI bits is determined not to be less than or equal to the second threshold, the UE may insert CRC bits into the UCI bits (e.g., at 716 and 416). Alternatively, the UE may determine to perform block 714. In aspects, the second threshold (e.g., determined at 414) may 2 bits or 11 bits. The determination, at 710, may be performed by the UCI bit component 1040 of the apparatus 1002 in FIG. 10.

At 712, the UE may determine whether a number of UCI bits in the set of HP UCI bits is greater than a threshold number. For example, referring to FIG. 4, the UE 402 may determine, at 412, whether the HP UCI bits is greater than the threshold. If, at 712, the number of HP UCI bits is determined to be greater than the threshold, the UE may insert CRC bits into the UCI bits (e.g., at 716 and 416). If, at 712, the number of HP UCI bits is determined not to be greater than the threshold, the UE may encode the HP UCI bits based on the diagram 750. The determination, at 712, may be performed by the UCI bit component 1040 of the apparatus 1002 in FIG. 10.

At 714, the UE may determine whether the number of UCI bits in the set of HP UCI bits/a first set of coded bits and the set of LP UCI bits is greater than the threshold number. For example, referring to FIG. 4, the UE 402 may determine, at 414, whether the HP UCI bits, which may be coded HP UCI bits, and the LP UCI bits is greater than the threshold. If, at 714, the number of HP UCI bits/first set of coded bits and the LP UCI bits is determined to be greater than the threshold, the UE may insert CRC bits into the UCI bits (e.g., at 716 and 416). If, at 714, the number of HP UCI bits/first set of coded bits and the LP UCI bits is determined not to be greater than the threshold, the UE may encode the HP UCI bits/first set of coded bits and the LP UCI bits jointly based on the diagram 750. The determination, at 714, may be performed by the UCI bit component 1040 of the apparatus 1002 in FIG. 10.

At 716, the UE may insert at least one CRC bit into at least one of the set of HP UCI bits before encoding the set of HP UCI bits through the first encoder, or the set of HP UCI bits/the first set of coded UCI bits and the set of LP UCI bits before jointly encoding the set of HP UCI bits/the first set of coded bits and the set of LP UCI bits through the second encoder. For example, referring to FIGS. 4-6, the UE 402 may insert, at 416, CRC bits into the UCI bits based on the determining, at 412, that the HP UCI bits is greater than the threshold, before the HP UCI bits are encoded, at 418, through the first encoder (e.g., before the first encoder 506/606 encodes the $K_{HP}$ HP UCI bits). The UE 402 may similarly insert, at 416, CRC bits into the UCI bits based on the determining, at 414, that the HP UCI bits, which may be coded HP UCI bits, and the LP UCI bits is greater than the threshold, before the HP UCI bits/coded HP UCI bits and the LP UCI bits are encoded, at 420, through the second encoder (e.g., before the second encoder 508 encodes the $K_{HP}$ HP UCI bits and the $K_{LP}$ LP UCI bits, and before the second encoder 608 encodes the $N_1$ coded bits and the $K_{LP}$ LP UCI bits). Following insertion, at 716, of the CRC bits into the UCI bits, the UE may encode the CRC/UCI bit stream based on the diagram 750. The insertion, at 716, may be performed by the CRC bit insertion component 1042 of the apparatus 1002 in FIG. 10.

At 718, the UE may encode the set of HP UCI bits twice through the first encoder and the second encoder, and the set of LP UCI bits once through the second encoder to generate a set of coded UCI bits. For example, referring to FIGS. 4-6, the UE 402 may encode the HP UCI bits, at 418, through the first encoder and, at 420, through the second encoder. In the diagram 500, the $K_{HP}$ HP UCI bits are encoded by the first encoder 506 and the second encoder 508, and the $K_{LP}$ LP UCI bits are encoded by the second encoder 508. In the diagram 600, the $K_{HP}$ HP UCI bits are encoded by the first encoder 606 into the $N_1$ coded bits, which are further encoded by the second encoder 608, and the $K_{LP}$ LP UCI bits are encoded by the second encoder 608. The encoding, at 718, may be performed by the encoder component 1044 of the apparatus 1002 in FIG. 10.

At 720, the UE may encode the set of HP UCI bits through the first encoder to generate the first set of coded UCI bits. For example, referring to FIGS. 5-6, the $K_{HP}$ HP UCI bits may be encoded by the first encoder 506/606 to generate the $N_1$ coded bits. The encoding, at 720, may be performed by the encoder component 1044 of the apparatus 1002 in FIG. 10.

At 722, the UE may encode, together through the second encoder, at least one of the set of LP UCI bits and the set of HP UCI bits, or the set of LP UCI bits and the first set of coded UCI bits to generate at least one of a second set of coded UCI bits or the set of coded UCI bits. For example, referring to FIGS. 5-6, the $K_{HP}$ HP UCI bits and the $K_{LP}$ HP UCI bits may be jointly encoded by the second encoder 508 to generate the $N_2$ coded bits, or the $N_1$ coded bits and the $K_{LP}$ HP UCI bits may be jointly encoded by the second encoder 608 to generate the $N_2$ coded bits (e.g., where the $N_2$ coded bits corresponds to a set of coded UCI bits). If, at 722, the $N_2$ coded bits corresponds to the set of coded UCI bits, the $N_2$ set of coded UCI bits may be provided for transmission to a base station. If, at 722, the $N_2$ coded bits corresponds to a second set of coded UCI bits and the $N_1$ coded bits corresponds to a first set of coded UCI bits, the first and second sets of coded UCI bits may be provided for to a multiplexer (e.g., the multiplexer 510). The encoding, at 722, may be performed by the encoder component 1044 of the apparatus 1002 in FIG. 10.

At 724, the UE may multiplex the first set of coded UCI bits and the second set of coded UCI bits to generate the set of coded UCI bits. For example, referring to FIG. 5, the multiplexer 510 may multiplex the $N_1$ coded bits and the $N_2$ coded bits to generate the set of $N_1+N_2$ coded bits. The set of $N_1+N_2$ coded UCI bits may be provided for transmission to a base station. The multiplexing, at 724, may be performed by the multiplexer component 1046 of the apparatus 1002 in FIG. 10.

At 726, the UE may transmit, to the base station, the set of coded UCI bits through one of a PUCCH or a PUSCH. For example, referring to FIG. 4, the UE 402 may transmit, at 422, the set of coded UCI bits to the base station 404 via PUCCH/PUSCH (e.g., based on multiplexing the UCI bits). The transmission, at 726, may be performed by the transmission component 1034 of the apparatus 1002 in FIG. 10.

Figure 8:
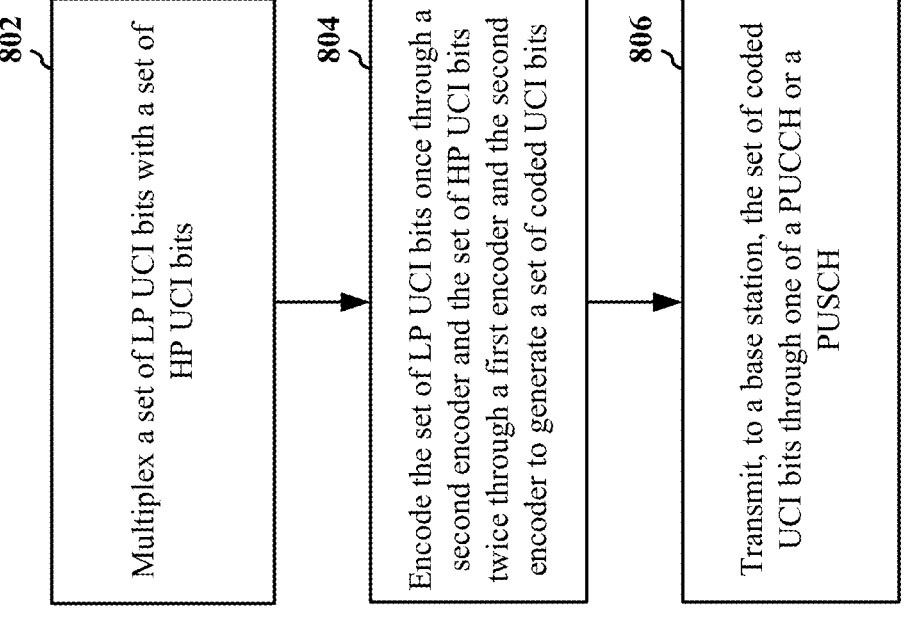
FIG. 8 is a flowchart of a method of wireless communication of a UE.

FIG. 8 is a flowchart 800 of a method of wireless communication. The method may be performed by a UE (e.g., the UE 104/402; the apparatus 1002; etc.), which may include the memory 360 and which may be the entire UE 104/402 or a component of the UE 104/402, such as the TX processor 368, the RX processor 356, and/or the controller/processor 359.

At 802, the UE may multiplex a set of LP UCI bits with a set of HP UCI bits. For example, referring to FIGS. 4-5, the UE 402 may determine, at 410, to multiplex HP UCI bits with LP UCI bits. In aspects, the multiplexer 510 may be used to multiplex the HP UCI bits with the LP UCI bits. The multiplexing, at 802, may be performed by the multiplexer component 1046 of the apparatus 1002 in FIG. 10.

At 804, the UE may encode the set of LP UCI bits once through a second encoder and the set of HP UCI bits twice through a first encoder and the second encoder to generate a set of coded UCI bits. For example, referring to FIGS. 4-6, the UE 402 may encode the HP UCI bits, at 418, through the first encoder and, at 420, through the second encoder. In the diagram 500, the $K_{HP}$ HP UCI bits are encoded by the first encoder 506 and the second encoder 508, and the $K_{LP}$ LP UCI bits are encoded by the second encoder 508. In the diagram 600, the $K_{HP}$ HP UCI bits are encoded by the first encoder 606 into the $N_1$ coded bits, which are further encoded by the second encoder 608, and the $K_{LP}$ LP UCI bits are encoded by the second encoder 608. The encoding, at 804, may be performed by the encoder component 1044 of the apparatus 1002 in FIG. 10.

At 806, the UE may transmit, to the base station, the set of coded UCI bits through one of a PUCCH or a PUSCH. For example, referring to FIG. 4, the UE 402 may transmit, at 422, the set of coded UCI bits to the base station 404 via PUCCH/PUSCH (e.g., based on multiplexing the UCI bits). The transmission, at 806, may be performed by the transmission component 1034 of the apparatus 1002 in FIG. 10.

FIG. 9 is a flowchart 900 of a method of wireless communication. The method may be performed by a base station (e.g., the base station 102/404; the apparatus 1102; etc.), which may include the memory 376 and which may be the entire base station 102/404 or a component of the base station 102/404, such as the TX processor 316, the RX processor 370, and/or the controller/processor 375.

At 902, the base station may transmit, to a UE, coding rate information for a first encoder of a set of HP UCI bits and a second encoder of a set of LP UCI bits and the set of HP UCI bits—a first encoding of the set of HP UCI bits and a second encoding of the set of LP UCI bits and the set of HP UCI bits corresponds to a multiplexed set of coded UCI bits. For example, referring to FIG. 4, the base station 404 may transmit, at 406, coding rate information to the UE 402 for a first/second encoder. The HP UCI bits may be encoded, at 418, through the first encoder and, at 420, through the second encoder, whereas the LP UCI bits may be encoded, at 420, through the second encoder. In the diagram 500, the $K_{HP}$ HP UCI bits are encoded by the first encoder 506 and the second encoder 508, and the $K_{LP}$ LP UCI bits are encoded by the second encoder 508 to generate $N_1+N_2$ coded bits (e.g., a multiplexed set of coded UCI bits). In the diagram 600, the $K_{HP}$ HP UCI bits are encoded by the first encoder 606 into the $N_1$ coded bits, which are further encoded by the second encoder 608, and the $K_{LP}$ LP UCI bits are encoded by the second encoder 608 to generate $N_2$ coded bits (e.g., a multiplexed set of coded UCI bits). The transmission, at 902, may be performed by the coding rate information component 1140 of the apparatus 1102 in FIG. 11.

At 904, the base station may receive, from the UE, the multiplexed set of coded UCI bits through one of a PUCCH or a PUSCH. For example, referring to FIG. 4, the base station 404 may receive, at 422, the set of coded UCI bits from the UE 402 via PUCCH/PUSCH (e.g., based on the UCI bits being multiplexed). The reception, at 904, may be performed by the coding rate information component 1140 of the apparatus 1102 in FIG. 11.

Figure 10:
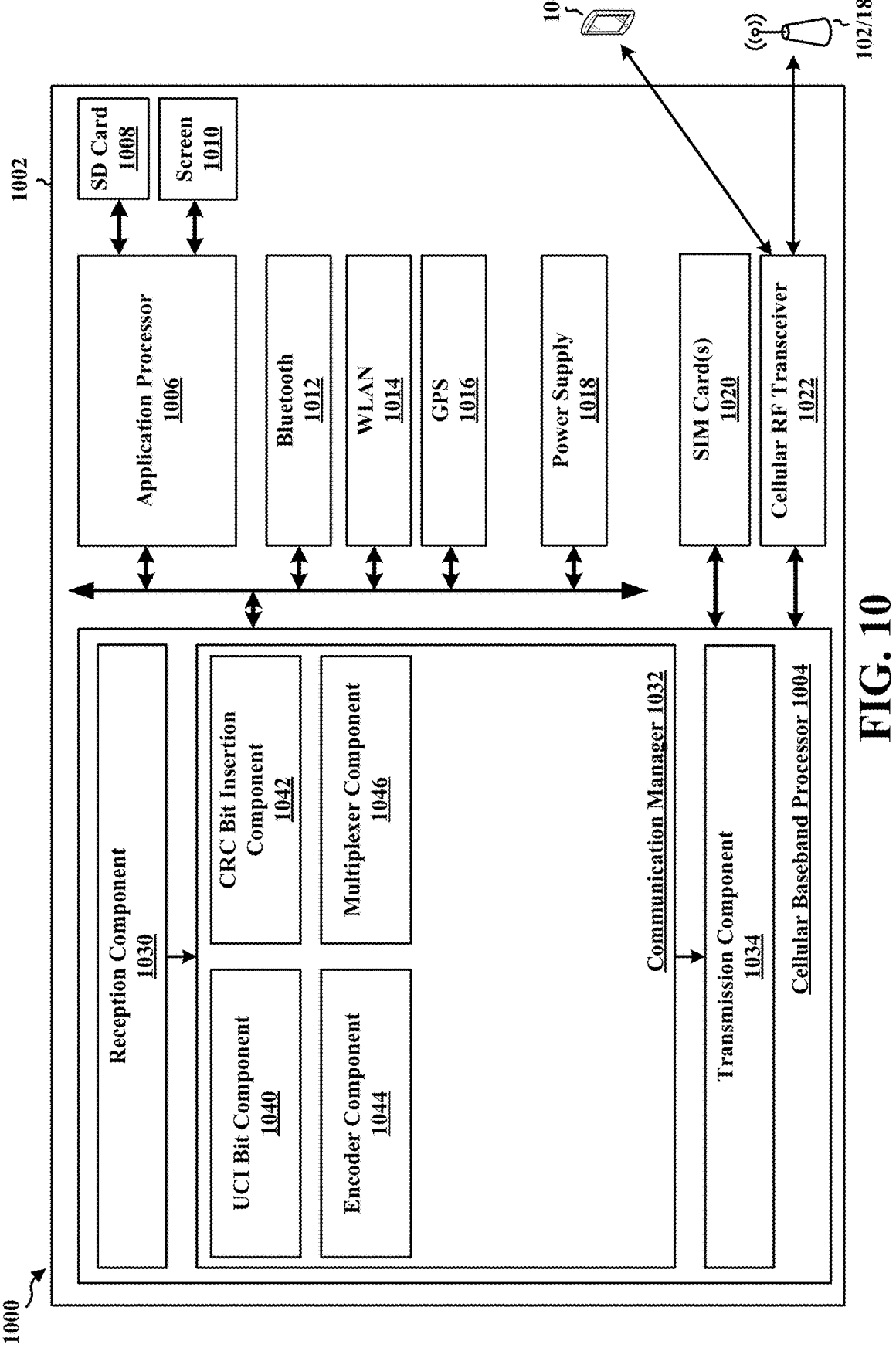
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see UE 350 of FIG. 3) and include the aforediscussed additional modules of the apparatus 1002.

The reception component 1030 is configured, e.g., as described in connection with 702, to receive, from a base station, coding rate information for a first encoder and a second encoder to encode UL transmissions based on the received coding rate information. The communication manager 1032 includes a UCI bit component 1040 that is configured, e.g., as described in connection with 704, 708, 710, 712, and 714, to determine that a first uplink UL transmission with a set of HP UCI bits overlaps at least partially in time with a second UL transmission with a set of LP UCI bits; to determine whether a first number of HP UCI bits in the set of HP UCI bits is less than or equal to a first threshold; to determine whether a second number of HP UCI bits and LP UCI bits in the set of HP UCI bits and the set of LP UCI bits is less than or equal to a second threshold; to determine whether a number of UCI bits in the set of HP UCI bits is greater than a threshold number; and to determine whether the number of UCI bits in the set of HP UCI bits/a first set of coded bits and the set of LP UCI bits is greater than the threshold number. The communication manager 1032 further includes a CRC bit insertion component 1042 that receives input from the UCI bit component 1040 and is configured, e.g., as described in connection with 716, to insert at least one CRC bit into at least one of the set of HP UCI bits before encoding the set of HP UCI bits through the first encoder, or the set of HP UCI bits/the first set of coded UCI bits and the set of LP UCI bits before jointly encoding the set of HP UCI bits/the first set of coded bits and the set of LP UCI bits through the second encoder.

The communication manager 1032 further includes an encoder component 1044 that receives input from the CRC bit insertion component 1042 and/or the UCI bit component 1040 and is configured, e.g., as described in connection with 718, 720, 722, and 804, to encode the set of HP UCI bits twice through the first encoder and the second encoder, and the set of LP UCI bits once through the second encoder to generate a set of coded UCI bits; to encode the set of HP UCI bits through the first encoder to generate the first set of coded UCI bits; and to encode, together through the second encoder, at least one of the set of LP UCI bits and the set of HP UCI bits, or the set of LP UCI bits and the first set of coded UCI bits to generate at least one of a second set of coded UCI bits or the set of coded UCI bits. The communication manager 1032 further includes a multiplexer component 1046 that receives input from the reception component 1030, the UCI bit component 1040, and/or the encoder component 1044 and is configured, e.g., as described in connection with 706, 724, and 802, to multiplex/determine to multiplex the set of LP UCI bits with the set of HP UCI bits; and to multiplex the first set of coded UCI bits and the second set of coded UCI bits to generate the set of coded UCI bits. The transmission component 1034 is configured, e.g., as described in connection with 726 and 806, to transmit, to the base station, the set of coded UCI bits through one of a PUCCH or a PUSCH.

The apparatus may include additional components that perform each of the blocks of the algorithm in the aforementioned flowcharts of FIGS. 7A-7B and FIG. 8. As such, each block in the aforementioned flowcharts of FIGS. 7A-7B and FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In configurations, the apparatus 1002, and in particular the cellular baseband processor 1004, includes means for multiplexing (and/or means for determining to multiplex) a set of LP UCI bits with a set of HP UCI bits; means for encoding the set of LP UCI bits once through a second encoder and the set of HP UCI bits twice through a first encoder and the second encoder to generate a set of coded UCI bits; and means for transmitting, to a base station, the set of coded UCI bits through one of a PUCCH or a PUSCH. In aspects, the means for encoding the set of LP UCI bits once through the second encoder and the set of HP UCI bits twice through the first encoder and the second encoder is further configured to encode the set of HP UCI bits through the first encoder to generate a first set of coded UCI bits; encode the set of LP UCI bits and the set of HP UCI bits together through the second encoder to generate a second set of coded UCI bits; and multiplex the first set of coded UCI bits and the second set of coded UCI bits to generate the set of coded UCI bits. The apparatus 1002 further includes means for determining whether a number of UCI bits in the set of HP UCI bits and the set of LP UCI bits is greater than a threshold number; and means for inserting at least one CRC bit into the set of HP UCI bits and the set of LP UCI bits before encoding the set of HP UCI bits and the set of LP UCI bits through the second encoder when the number of UCI bits in the set of HP UCI bits and the set of LP UCI bits is greater than the threshold number. The apparatus 1002 further includes means for determining whether a number of UCI bits in the set of HP UCI bits is greater than a threshold number; and means for inserting at least one CRC bit into the set of HP UCI bits before encoding the set of HP UCI bits through the first encoder when the number of UCI bits in the set of HP UCI bits is greater than the threshold number.

In other configurations, the means for encoding the set of LP UCI bits once through the second encoder and the set of HP UCI bits twice through the first encoder and the second encoder is further configured to encode the set of HP UCI bits through the first encoder to generate a first set of coded UCI bits; and encode the set of LP UCI bits and the first set of coded UCI bits together through the second encoder to generate the set of coded UCI bits. The apparatus 1002 further includes means for determining whether a number of UCI bits in the set of HP UCI bits is greater than a threshold number; and means for inserting at least one CRC bit into the set of HP UCI bits before encoding the set of HP UCI bits through the first encoder when the number of UCI bits in the set of HP UCI bits is greater than the threshold number. The apparatus 1002 further includes means for determining whether a number of UCI bits in the first set of coded UCI bits and the set of LP UCI bits is greater than a threshold number; and means for inserting at least one CRC bit into the first set of coded UCI bits and the set of LP UCI bits before encoding the first set of coded UCI bits and the set of LP UCI bits through the second encoder when the number of UCI bits in the first set of coded UCI bits and the set of LP UCI bits is greater than the threshold number.

In the same or different configurations, the apparatus 1002 further includes means for receiving, from the base station, coding rate information for the first encoder and the second encoder, where the encoding is based on the received coding rate information. The apparatus 1002 further includes means for determining that a first UL transmission with the set of HP UCI bits overlaps at least partially in time with a second UL transmission with the set of LP UCI bits, where the determination to multiplex the set of LP UCI bits and the set of HP UCI bits together is based on the determination that the first UL transmission with the set of HP UCI bits and the second UL transmission with the set of LP UCI bits overlaps at least partially in time. The apparatus 1002 further includes means for determining whether a first number of HP UCI bits in the set of HP UCI bits is less than or equal to a first threshold, and means for determining whether a second number of HP UCI bits and LP UCI bits in the set of HP UCI bits and the set of LP UCI bits is less than or equal to a second threshold, where the encoding the set of LP UCI bits once through the second encoder and the set of HP UCI bits twice through the first encoder and the second encoder is performed based on at least one of the first number of HP UCI bits being less than or equal to the first threshold or the second number of HP UCI bits and LP UCI bits being less than or equal to the second threshold.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
FIG. 11 is a diagram illustrating an example of a hardware implementation for an example apparatus.

FIG. 11 is a diagram 1100 illustrating an example of a hardware implementation for an apparatus 1102. The apparatus 1102 may be a base station, a component of a base station, or may implement base station functionality. In some aspects, the apparatus 1102 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 includes a coding rate information component 1140 that is configured, e.g., as described in connection with 902 and 904, to transmit, to a UE, coding rate information for a first encoder of a set of HP UCI bits and a second encoder of a set of LP UCI bits and the set of HP UCI bits—a first encoding of the set of HP UCI bits and a second encoding of the set of LP UCI bits and the set of HP UCI bits corresponds to a multiplexed set of coded UCI bits; and to receive, from the UE, the multiplexed set of coded UCI bits through one of a PUCCH or a PUSCH.

The apparatus may include additional components that perform each of the blocks of the algorithm in the flowchart of FIG. 9. As such, each block in the flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for transmitting, to a UE, coding rate information for a first encoder of a set of HP UCI bits and a second encoder of a set of LP UCI bits and the set of HP UCI bits, a first encoding of the set of HP UCI bits and a second encoding of the set of LP UCI bits and the set of HP UCI bits corresponding to a multiplexed set of coded UCI bits; and means for receiving, from the UE, the multiplexed set of coded UCI bits through one of a PUCCH or a PUSCH.

The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, including: multiplexing a set of LP UCI bits with a set of HP UCI bits; encoding the set of LP UCI bits once through a second encoder and the set of HP UCI bits twice through a first encoder and the second encoder to generate a set of coded UCI bits; and transmitting, to a base station, the set of coded UCI bits through one of a PUCCH or a PUSCH.

Aspect 2 may be combined with aspect 1 and includes that the encoding the set of LP UCI bits once through the second encoder and the set of HP UCI bits twice through the first encoder and the second encoder further includes: encoding the set of HP UCI bits through the first encoder to generate a first set of coded UCI bits; encoding the set of LP UCI bits and the set of HP UCI bits together through the second encoder to generate a second set of coded UCI bits; and multiplexing the first set of coded UCI bits and the second set of coded UCI bits to generate the set of coded UCI bits.

Aspect 3 may be combined with any of aspects 1-2 and further includes inserting at least one CRC bit into the set of HP UCI bits and the set of LP UCI bits before encoding the set of HP UCI bits and the set of LP UCI bits through the second encoder when a number of UCI bits in the set of HP UCI bits and the set of LP UCI bits is greater than a threshold number.

Aspect 4 may be combined with any of aspects 1-3 and further includes inserting at least one CRC bit into the set of HP UCI bits before encoding the set of HP UCI bits through the first encoder when a number of UCI bits in the set of HP UCI bits is greater than a threshold number.

Aspect 5 may be combined with any of aspects 1-4 and includes that the set of HP UCI bits includes one bit and the set of LP UCI bits includes another one bit, and the first set of coded UCI bits are encoded through a repetition code and the second set of coded UCI bits are encoded through a simplex code.

Aspect 6 may be combined with aspect 1 and includes that the encoding the set of LP UCI bits once through the second encoder and the set of HP UCI bits twice through the first encoder and the second encoder further includes: encoding the set of HP UCI bits through the first encoder to generate a first set of coded UCI bits; and encoding the set of LP UCI bits and the first set of coded UCI bits together through the second encoder to generate the set of coded UCI bits.

Aspect 7 may be combined with any of aspects 1 or 6 and further includes inserting at least one CRC bit into the set of HP UCI bits before encoding the set of HP UCI bits through the first encoder when a number of UCI bits in the set of HP UCI bits is greater than a threshold number.

Aspect 8 may be combined with any of aspects 1 or 6-7 and further includes inserting at least one CRC bit into the first set of coded UCI bits and the set of LP UCI bits before encoding the first set of coded UCI bits and the set of LP UCI bits through the second encoder when a number of UCI bits in the first set of coded UCI bits and the set of LP UCI bits is greater than a threshold number.

Aspect 9 may be combined with any of aspects 1-8 and further includes receiving, from the base station, coding rate information for the first encoder and the second encoder, where the encoding is based on the received coding rate information.

Aspect 10 may be combined with any of aspects 1-9 and includes that the coding rate information is received through one of a RRC message, a MAC-CE, or DCI.

Aspect 11 may be combined with any of aspects 1-10 and includes that the received coding rate information further includes information indicating a first coding rate for the first encoder and a second coding rate for the second encoder.

Aspect 12 may be combined with any of aspects 1-11 and includes that a first UL transmission with the set of HP UCI bits overlaps at least partially in time with a second UL transmission with the set of LP UCI bits, and where the set of LP UCI bits and the set of HP UCI bits are multiplexed based on the first UL transmission with the set of HP UCI bits and the second UL transmission with the set of LP UCI bits overlapping at least partially in time.

Aspect 13 may be combined with any of aspects 1-3, 5-6, or 8-12 and includes that a first number of HP UCI bits in the set of HP UCI bits is less than or equal to a first threshold, and a second number of HP UCI bits and LP UCI bits in the set of HP UCI bits and the set of LP UCI bits is less than or equal to a second threshold, and where the set of LP UCI bits is encoded once through the second encoder and the set of HP UCI bits is encoded twice through the first encoder and the second encoder based on at least one of the first number of HP UCI bits being less than or equal to the first threshold or the second number of HP UCI bits and LP UCI bits being less than or equal to the second threshold.

Aspect 14 may be combined with any of aspects 1-13 and includes that the first threshold is 2 bits or 11 bits, and the second threshold is 2 bits or 11 bits.

Aspect 15 is a method of wireless communication at a base station including: transmitting, to a UE, coding rate information for a first encoder of a set of HP UCI bits and a second encoder of a set of LP UCI bits and the set of HP UCI bits, a first encoding of the set of HP UCI bits and a second encoding of the set of LP UCI bits and the set of HP UCI bits corresponding to a multiplexed set of coded UCI bits; and receiving, from the UE, the multiplexed set of coded UCI bits through one of a PUCCH or a PUSCH.

Aspect 16 is an apparatus for wireless communication including at least one processor coupled to a memory and configured to implement a method as in any of aspects 1-15.

Aspect 17 may be combined with aspect 16 and further includes at least one of an antenna or a transceiver coupled to the at least one processor.

Aspect 18 is an apparatus for wireless communication including means for implementing a method as in any of aspects 1-15.

Aspect 19 is a non-transitory computer-readable medium storing computer executable code, the code when executed by at least one processor causes the at least one processor to implement a method as in any of aspects 1-15.

What is claimed is:

1. An apparatus for wireless communication at a user equipment (UE), comprising:
   memory; and
   at least one processor coupled to the memory, wherein the at least one processor is configured to:
   multiplex a set of low priority (LP) uplink control information (UCI) bits with a set of high priority (HP) UCI bits;
   encode the set of LP UCI bits once through a second encoder and the set of HP UCI bits twice, initially through a first encoder and subsequently as coded bits through the second encoder, to generate a set of coded UCI bits; and
   transmit, to a base station, the set of coded UCI bits through one of a physical uplink control channel (PUCCH) or a physical uplink shared channel (PUSCH).

2. The apparatus of claim 1, wherein to encode the set of LP UCI bits once through the second encoder and the set of HP UCI bits twice, initially through the first encoder and subsequently as the coded bits through the second encoder, the at least one processor is further configured to:

encode the set of HP UCI bits through the first encoder to generate a first set of coded UCI bits;

encode the set of LP UCI bits and the set of HP UCI bits together through the second encoder to generate a second set of coded UCI bits; and multiplex the first set of coded UCI bits and the second set of coded UCI bits to generate the set of coded UCI bits.

3. The apparatus of claim 2, wherein the at least one processor is further configured to insert at least one cyclic redundancy check (CRC) bit into the set of HP UCI bits and the set of LP UCI bits before said encode the set of HP UCI bits and the set of LP UCI bits through the second encoder when a number of UCI bits in the set of HP UCI bits and the set of LP UCI bits is greater than a threshold number.

4. The apparatus of claim 2, wherein the at least one processor is further configured to insert at least one cyclic redundancy check (CRC) bit into the set of HP UCI bits before said encode the set of HP UCI bits through the first encoder when a number of UCI bits in the set of HP UCI bits is greater than a threshold number.

5. The apparatus of claim 2, wherein the set of HP UCI bits includes one bit and the set of LP UCI bits includes another one bit, and the first set of coded UCI bits are encoded through a repetition code and the second set of coded UCI bits are encoded through a simplex code.

6. The apparatus of claim 1, wherein to encode the set of LP UCI bits once through the second encoder and the set of HP UCI bits twice, initially through the first encoder and subsequently as the coded bits through the second encoder the at least one processor is further configured to:

encode the set of HP UCI bits through the first encoder to generate a first set of coded UCI bits; and encode the set of LP UCI bits and the first set of coded UCI bits together through the second encoder to generate the set of coded UCI bits.

7. The apparatus of claim 6, wherein the at least one processor is further configured to insert at least one cyclic redundancy check (CRC) bit into the set of HP UCI bits before said encode the set of HP UCI bits through the first encoder when a number of UCI bits in the set of HP UCI bits is greater than a threshold number.

8. The apparatus of claim 6, wherein the at least one processor is further configured to insert at least one cyclic redundancy check (CRC) bit into the first set of coded UCI bits and the set of LP UCI bits before said encode the first set of coded UCI bits and the set of LP UCI bits through the second encoder when a number of UCI bits in the first set of coded UCI bits and the set of LP UCI bits is greater than a threshold number.

9. The apparatus of claim 1, wherein the at least one processor is further configured to receive, from the base station, coding rate information for the first encoder and the second encoder, wherein the encoding is based on the received coding rate information.

10. The apparatus of claim 9, wherein to receive the coding rate information, the at least one processor is configured to receive the coding rate information through one of a radio resource control (RRC) message, a medium access control (MAC) control element (CE) (MAC-CE), or downlink control information (DCI).

11. The apparatus of claim 9, wherein the received coding rate information includes information indicating a first coding rate for the first encoder and a second coding rate for the second encoder.

12. The apparatus of claim 1, wherein a first uplink (UL) transmission with the set of HP UCI bits overlaps at least partially in time with a second UL transmission with the set of LP UCI bits, and wherein the set of LP UCI bits and the set of HP UCI bits are multiplexed based on the first UL transmission with the set of HP UCI bits and the second UL transmission with the set of LP UCI bits overlapping at least partially in time.

13. The apparatus of claim 1, wherein a first number of HP UCI bits in the set of HP UCI bits is less than or equal to a first threshold, and a second number of HP UCI bits and LP UCI bits in the set of HP UCI bits and the set of LP UCI bits is less than or equal to a second threshold, and wherein the set of LP UCI bits is encoded once through the second encoder and the set of HP UCI bits is encoded twice through the first encoder and the second encoder based on at least one of the first number of HP UCI bits being less than or equal to the first threshold or the second number of HP UCI bits and the set of LP UCI bits being less than or equal to the second threshold.

14. The apparatus of claim 13, where the first threshold is 2 bits or 11 bits, and the second threshold is 2 bits or 11 bits.

15. An apparatus for wireless communication at a base station, comprising:

memory; and at least one processor coupled to the memory, wherein the at least one processor is configured to:

transmit, to a user equipment (UE), coding rate information for a first encoder of a set of high priority (HP) uplink control information (UCI) bits and a second encoder of a set of low priority (LP) UCI bits and the set of HP UCI bits subsequent to a coding by the first encoder, a first encoding of the set of HP UCI bits and a second encoding of the set of LP UCI bits and the set of HP UCI bits corresponding to a multiplexed set of coded UCI bits; and receive, from the UE, the multiplexed set of coded UCI bits through one of a physical uplink control channel (PUCCH) or a physical uplink shared channel (PUSCH).

16. A method of wireless communication at a user equipment (UE), comprising:

multiplexing a set of low priority (LP) uplink control information (UCI) bits with a set of high priority (HP) UCI bits;

encoding the set of LP UCI bits once through a second encoder and the set of HP UCI bits twice, initially through a first encoder and subsequently as coded bits through the second encoder to generate a set of coded UCI bits; and transmitting, to a base station, the set of coded UCI bits through one of a physical uplink control channel (PUCCH) or a physical uplink shared channel (PUSCH).

17. The method of claim 16, wherein the encoding the set of LP UCI bits once through the second encoder and the set of HP UCI bits twice, initially through the first encoder and subsequently as the coded bits through the second encoder comprises:

encoding the set of HP UCI bits through the first encoder to generate a first set of coded UCI bits;

encoding the set of LP UCI bits and the set of HP UCI bits together through the second encoder to generate a second set of coded UCI bits; and multiplexing the first set of coded UCI bits and the second set of coded UCI bits to generate the set of coded UCI bits.

18. The method of claim 17, further comprising inserting at least one cyclic redundancy check (CRC) bit into the set of HP UCI bits and the set of LP UCI bits before encoding the set of HP UCI bits and the set of LP UCI bits through the second encoder when a number of UCI bits in the set of HP UCI bits and the set of LP UCI bits is greater than a threshold number.

19. The method of claim 17, further comprising inserting at least one cyclic redundancy check (CRC) bit into the set of HP UCI bits before encoding the set of HP UCI bits through the first encoder when a number of UCI bits in the set of HP UCI bits is greater than a threshold number.

20. The method of claim 17, wherein the set of HP UCI bits includes one bit and the set of LP UCI bits includes another one bit, and the first set of coded UCI bits are encoded through a repetition code and the second set of coded UCI bits are encoded through a simplex code.

21. The method of claim 16, wherein the encoding the set of LP UCI bits once through the second encoder and the set of HP UCI bits twice, initially through the first encoder and subsequently as the coded bits through the second encoder comprises:

encoding the set of HP UCI bits through the first encoder to generate a first set of coded UCI bits; and encoding the set of LP UCI bits and the first set of coded UCI bits together through the second encoder to generate the set of coded UCI bits.

22. The method of claim 21, further comprising inserting at least one cyclic redundancy check (CRC) bit into the set of HP UCI bits before encoding the set of HP UCI bits through the first encoder when a number of UCI bits in the set of HP UCI bits is greater than a threshold number.

23. The method of claim 21, further comprising inserting at least one cyclic redundancy check (CRC) bit into the first set of coded UCI bits and the set of LP UCI bits before encoding the first set of coded UCI bits and the set of LP UCI bits through the second encoder when a number of UCI bits in the first set of coded UCI bits and the set of LP UCI bits is greater than a threshold number.

24. The method of claim 16, further comprising receiving, from the base station, coding rate information for the first encoder and the second encoder, wherein the encoding is based on the received coding rate information.

25. The method of claim 24, wherein the coding rate information is received through one of a radio resource control (RRC) message, a medium access control (MAC) control element (CE) (MAC-CE), or downlink control information (DCI).

26. The method of claim 24, wherein the received coding rate information includes information indicating a first coding rate for the first encoder and a second coding rate for the second encoder.

27. The method of claim 16, wherein a first uplink (UL) transmission with the set of HP UCI bits overlaps at least partially in time with a second UL transmission with the set of LP UCI bits, and wherein the set of LP UCI bits and the set of HP UCI bits are multiplexed based on the first UL transmission with the set of HP UCI bits and the second UL transmission with the set of LP UCI bits overlapping at least partially in time.

28. The method of claim 16, wherein a first number of HP UCI bits in the set of HP UCI bits is less than or equal to a first threshold, and a second number of HP UCI bits and LP UCI bits in the set of HP UCI bits and the set of LP UCI bits is less than or equal to a second threshold, and wherein the set of LP UCI bits is encoded once through the second encoder and the set of HP UCI bits is encoded twice through the first encoder and the second encoder based on at least one of the first number of HP UCI bits being less than or equal to the first threshold or the second number of HP UCI bits and the set of LP UCI bits being less than or equal to the second threshold.

29. The method of claim 28, where the first threshold is 2 bits or 11 bits, and the second threshold is 2 bits or 11 bits.

30. A method of wireless communication at a base station, comprising:

transmitting, to a user equipment (UE), coding rate information for a first encoder of a set of high priority (HP) uplink control information (UCI) bits and a second encoder of a set of low priority (LP) UCI bits and the set of HP UCI bits subsequent to a coding by the first encoder, a first encoding of the set of HP UCI bits and a second encoding of the set of LP UCI bits and the set of HP UCI bits corresponding to a multiplexed set of coded UCI bits; and receiving, from the UE, the multiplexed set of coded UCI bits through one of a physical uplink control channel (PUCCH) or a physical uplink shared channel (PUSCH).

* * * * *